United States Patent

[11] 3,629,557

| [72] | Inventor | Armand R. Lareau |
| | | 271 Pleasant St., Leominster, Mass. 01453 |
| [21] | Appl. No. | 42,768 |
| [22] | Filed | June 2, 1970 |
| [45] | Patented | Dec. 21, 1971 |

[54] YARDAGE INDICATOR
10 Claims, 9 Drawing Figs.

[52] U.S. Cl. .................................................. 235/95, 33/141
[51] Int. Cl. .................................................. G01c 22/00
[50] Field of Search .................................. 235/95, 96; 33/141 A, 141.5

[56] References Cited
UNITED STATES PATENTS

| 745,726 | 12/1903 | Hathaway | 235/95 |
| 2,327,657 | 8/1943 | Middleton | 235/95 X |
| 2,505,205 | 4/1950 | Regna | 33/141 X |
| 2,580,538 | 1/1952 | Gentsch | 235/95 |
| 2,772,832 | 12/1956 | Lassiter | 235/95 |
| 3,137,073 | 6/1964 | Rawlinson | 235/95 X |
| 3,251,545 | 5/1966 | Looney | 235/95 |
| 3,355,101 | 11/1967 | Levinson | 235/95 |
| 3,441,209 | 4/1969 | Farman | 235/95 |
| 3,458,128 | 7/1969 | Tillman | 235/95 |

Primary Examiner—Richard B. Wilkinson
Assistant Examiner—Stanley A. Wau
Attorneys—Clarence A. O'Brien and Harvey B. Jacobson ABSTRACT: A wheeled carriage attached to a golf cart having an odometer secured thereto for measuring distance traversed by the carriage. The carriage is principally comprised of two tubular sections that are pivotally joined to a bracket serving as a universal joint. The outward end of the outer tubular section carries a wheel to which an odometer worm gear is attached. The gear is connected to a counter via a cable for translating rotary motion of the wheel into distance traveled by the cart. The tubular section mounting the wheel may be folded against the cart for compact storage.

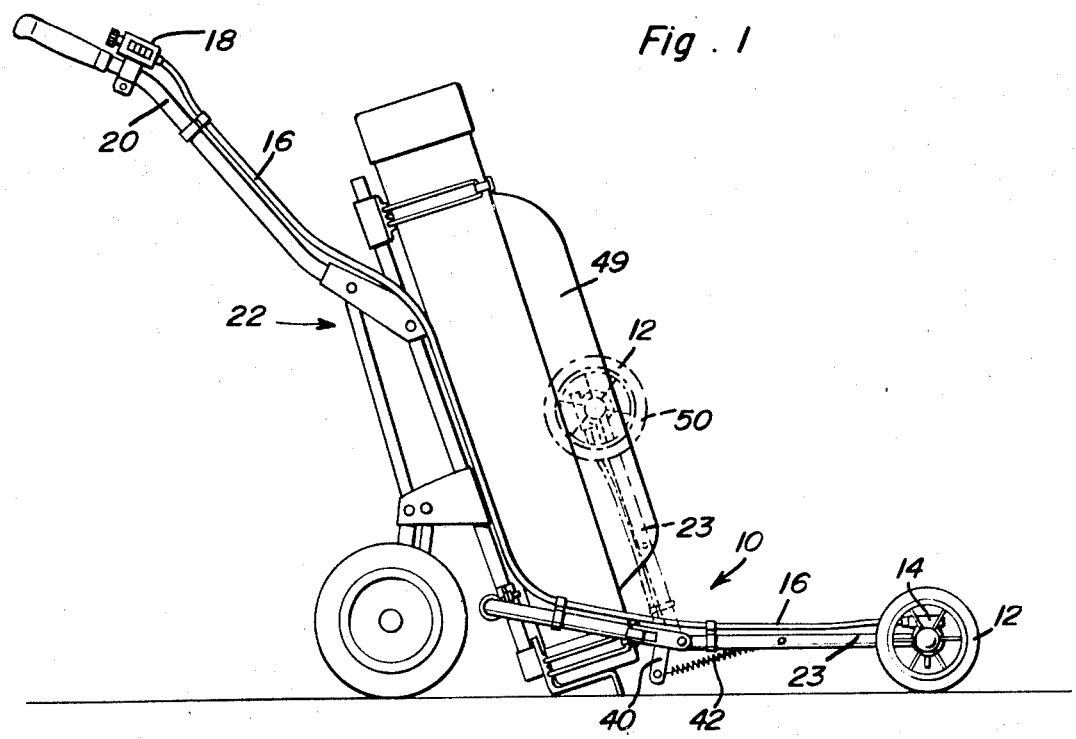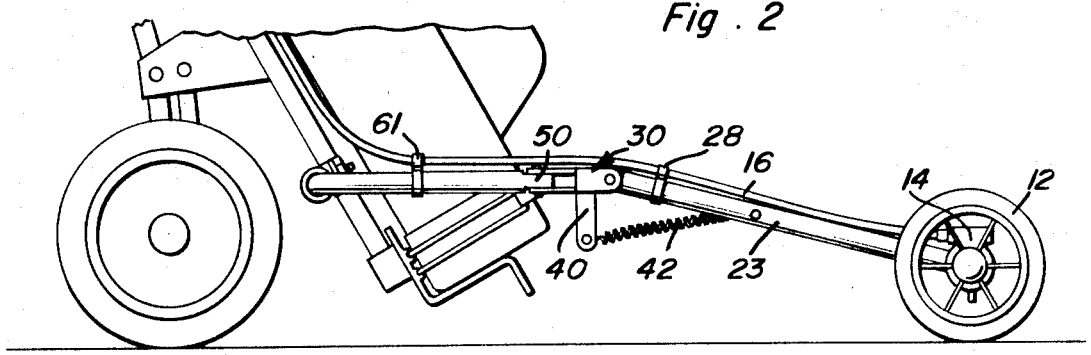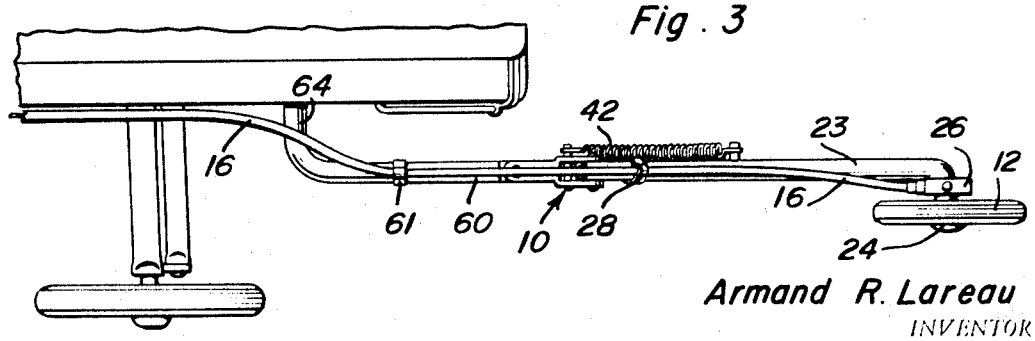

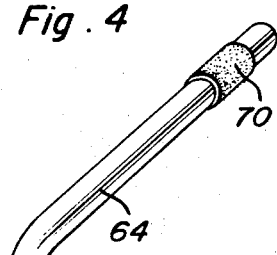
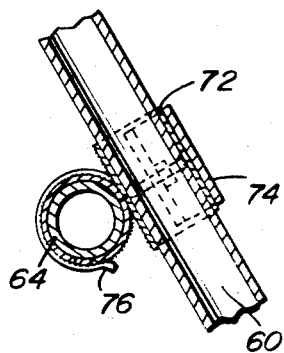
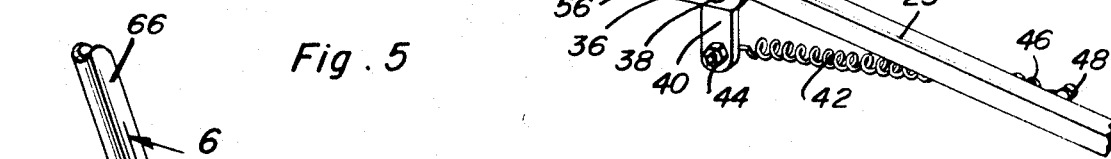
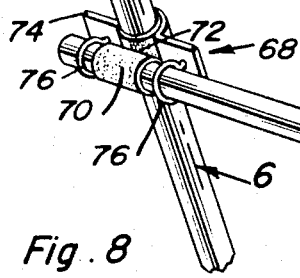
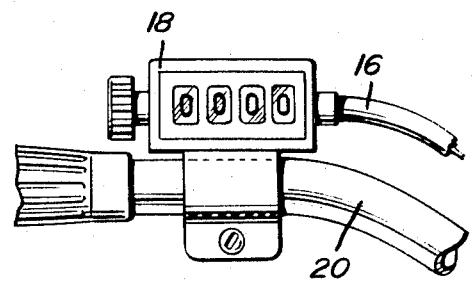
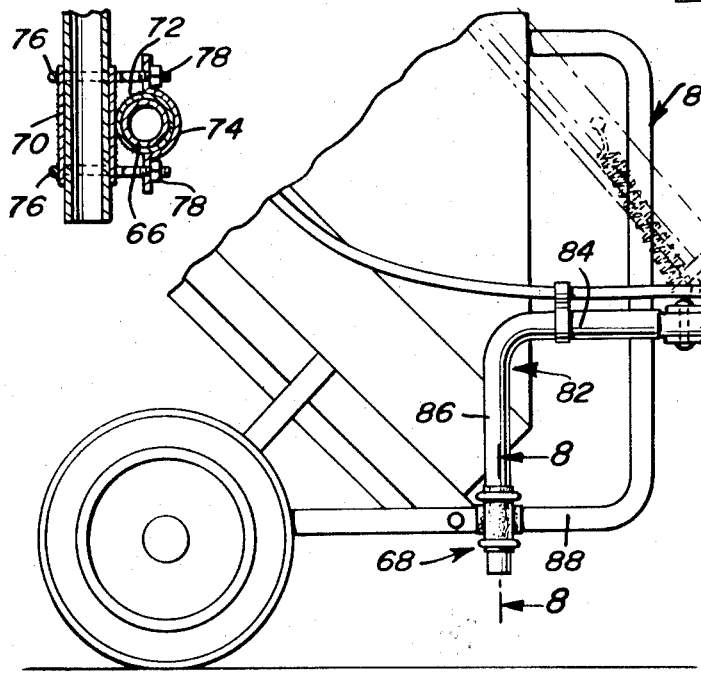

YARDAGE INDICATOR

The present invention relates to measuring devices and more particularly to an odometer assembly connected to the wheel of a cart for measuring the distance traversed by the cart.

In the past, measuring devices including an odometer assembly have been attached to golf carts for allowing accurate measurement of golf shots. Generally, these devices include a carriage that mounts a wheel, the wheel being associated with a worm gear which translates rotary wheel motion into yards traversed by the cart. However, a principal disadvantage of prior art devices has been the solid construction of the carriage which requires its removal from the cart when the latter is to be stored or carried from place to place in the trunk of a car. Further, prior art carriages have been prone to breakage when subjected to irregular terrain. Previously conceived carriage designs also suffer from their inability to remain tightly clamped to a golf cart without the use of heavy brackets or special locking fasteners.

The present invention includes a carriage which is principally comprised of two tubular sections connected to one another through a universal joint in the form of a simple multiple clevis bracket. This bracket enables the sections to undergo vertical pivotal displacement as well as horizontal pivotal displacement thereby protecting the measuring device from injury when ground obstacles are encountered. Further, a spring is connected between the outer tubular section mounting the wheel and the bracket so that the wheel is maintained in intimate engagement with a ground surface to accurately measure traversed distance. The pivotal connection of the sections allows the folding of the outer section against the golf cart thereby producing a compact package for storage or transport. Still further, the aforementioned spring retains the carriage in secure clamping relation with the frame of a golf cart. These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view illustrating the connection of a distance indicator carriage to a golf cart.

FIG. 2 is a partial exploded view illustrating the carriage shown in FIG. 1.

FIG. 3 is a top plan view of the structure illustrated in FIG. 2.

FIG. 4 is a partial perspective view illustrating a bracket serving as a universal joint between the two tubular sections of the carriage.

FIG. 5 is a partial perspective view illustrating the means of securing the carriage to a frame member of the golf cart.

FIG. 6 is a partial sectional view taken along a plane passing through section line 6—6 of FIG. 5.

FIG. 7 is a side elevational view of a second embodiment of the present invention similar to that of the first but particularly adapted to a golf cart of different design than the one illustrated in FIG. 1.

FIG. 8 is a transverse sectional view taken along a plane passing through section line 8—8 of FIG. 7.

FIG. 9 is an elevational view illustrating a counter attached to the handle of a golf cart, the counter indicating traversed distance.

Referring to the figures and more particularly FIG. 1, reference numeral 10 generally indicates a carriage principally comprised of two tubular sections connected together and mounting a wheel 12 at the outer end thereof. The wheel 12 is operatively associated with a worm gear mechanism 14 which translates rotary motion of the wheel to a cable 16 in a conventional manner. The cable 16 is connected at the outer end to a counter 18 more clearly illustrated in FIG. 9. This counter is resettable and indicates the distance traversed by the wheel 12. Preferably, the diameter of wheel 12 is designed to register traversed yardage. However, other dimensional parameters such as feet or miles may be indicated if the odometer mechanism is to be used in conjunction with something other than a golf cart. As will be seen in FIGS. 1 and 9, the counter is clamped to the upper end portion of a handlebar 20 that forms part of a conventional golf cart 22.

Referring to FIG. 3, the outward end of carriage 10 is seen to include a tubular structural member 23 that extends outwardly to a right angle offset section which rotationally mounts an axle 24 connected to wheel 12. The worm gear mechanism 14 is mounted to the outward end of section 23 and as previously mentioned operates in a conventional manner to translate rotational motion of wheel 12 to rotational motion of odometer cable 16 which in turn operates counter 18. A clamp 28 is attached to the inner end of section 23 and serves to fasten odometer cable 16 in place.

Referring to FIG. 4, the inner end of section 23 is pivotally mounted to a bracket 30 which serves as a universal joint connecting the outer section 23 to an inner section 59 to be discussed hereinafter.

The bracket 30 includes a first clevis portion 32 having oppositely disposed flanges 34 and 36 through which a pivot pin 38 passes and pivotally engages the inner end of section 23. An ear 40 projects downwardly from flange 32 and includes an aperture therein for securing a fastener 44. The fastener fastens the first end of an elongated coil spring 42 while the opposite end 46 of the spring is secured to a pin 48 that is fixed to an intermediate point along the length of section 23. The spring serves to normally bias section 23 downwardly thereby urging wheel 12 to maintain intimate engagement with the ground surface being traversed. This insures an accurate odometer indication of the distance traversed, notwithstanding the presence of holes, rocks, and other obstructions. The pivotal mounting of the section 23 to clevis 32 restricts the motion of section 23 to a vertical plane, relative to bracket 30, which permits the upward rotation of section 23 into proximity with the golf bag 49 which is mounted on golf cart 22 in the conventional mode. As will be noted from the phantom illustration in FIG. 2, spring 42 swings over center with respect to ear 40 when section 23 is pivoted into close proximity with the club bag 49 as indicated by reference numeral 50. In the phantom position, spring 42 biases section 23 and its attached wheel 12 against the bag so as to present a compact package and prevent its dislocation during transport or storage.

Referring back to FIG. 4, a web portion 52 of bracket 30 connects the oppositely disposed flanges 32 and 36 of the bracket. The web 52 also serves to connect flanges 54 and 56 in parallel spaced relation to form a clevis for an end 58 of a second structural tubular member 59 that serves as a second section of carriage 10. It will be noted that the flanges 34 and 36 lie on vertical spaced planes perpendicularly oriented to the planes of horizontally disposed flanges 54 and 56. A pivot pin 62 passes through the flanges 54 and 56 as well as the end 58 of section 59 thereby effecting a pivotal mounting of the section in a horizontal plane. As illustrated in FIGS. 2 and 3, a second cable clamp 61 is clamped to an intermediate portion 60 of section 59. This clamp serves to secure the odometer cable 16 in place. The inward end of the tubular portion 60 articulates to a right angle offset portion 64. The end of this offset portion is disposed in perpendicular engaging relation with a vertical frame member 66 of the golf cart 22, as seen in FIG. 5. More particularly, an antenna mast-type bracket 68 embracingly clamps frame member 66 to the outward end of tubular member portion 64. Abrasive strips 70 and 72 are wrapped around frame member 66 and tubular portion 64 to resist relative slipping therebetween. The bracket 68 includes outwardly extending flanges 74 that mount eyebolts 76, the eyebolts receiving the tubular portion 64 therethrough. Nut fasteners 78 (FIG. 8) secure eyebolts 76 in bracket 68. Nut tightening causes clamping engagement between the cart frame member 66 and the tubular portion 64.

FIG. 7 illustrates a second carriage assembly that generally resembles the aforementioned carriage assembly except for a modification in the shape of the inner carriage section. This modification is made to accommodate a second type of conventional golf cart generally indicated by reference numeral 80. As will be noted in FIG. 7, the inner carriage section 82 includes a first horizontal portion 84 similar to that of portion 60 as shown in FIG. 4. However, the inner portion of the section is deformed vertically downwardly at right angles as opposed to being deformed horizontally at right angles, as was the case in FIG. 4. Thus, as illustrated in FIG. 7, the inner portion 86 of section 82 is turned vertically downwardly until a cart frame member 88 is intersected. The carriage portion 86 is clamped to the frame member 88 by a bracket 68 as previously discussed in connection with FIG. 5. Thus, the present invention will be seen to be easily adapted to different types of available golf carts by simply changing the shape of the inner carriage section.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An assembly for indicating traveled distance comprising a wheel, odometer means connected to the wheel, a bracket located remotely from the wheel, a first structural member having one end rotatably mounting the wheel, the opposite end of the member movably mounted to the bracket, a second structural member mounted at one end thereof to the bracket, and means connecting the free end of the second structural member to a movable vehicle, the bracket including a first clevis pivotally mounting the first structural member, and a second clevis pivotally mounting the second structural member wherein the clevises are oriented to effect mutually perpendicular movement of the members, the bracket further including a mounting element for attaching one end of a spring, the opposite end of the spring being secured to the first structural member whereby the spring normally biases the wheel into intimate ground engagement, and further whereby the first structural member can be pivoted into a folded condition so that the spring is moved to a new position urging the first structural member to maintain the folded condition.

2. The structure of claim 1 wherein the movable vehicle is a gold cart having a frame connecting the free end of the second structural member and further wherein the means connecting the free end of the second structural member to the vehicle includes an abrasive strip attached to the free end, a second abrasive strip attached to the cart frame and a bracket for clamping the free end and the frame together whereby the abrasive strips contact each other thereby resisting slipping of the clamped parts.

3. The structure of claim 2 wherein the cart includes a handle and further wherein the odometer means includes a counter attached to the handle for indicating the distance traveled by the cart.

4. An assembly for indicating the distance traveled over the ground comprising a first structural member having first and second end portions, a wheel rotatably connected to said first end portion, distance measuring means connected to said wheel for measuring the distance travelled over the ground, joint means connected to said second end portion of said first structural member for permitting pivotal movement of said first structural member and said wheel in the vertical direction in relation to the ground, and biasing means for biasing said wheel and said first structural member in the downward direction relative to the ground when said structural member and said wheel are in the measuring position for maintaining said wheel in intimate engagement with the ground to assure accurate distance measurements of the ground traversed, said biasing means selectively maintaining said first structural member in the folded position remote from the ground when said first structural member and the wheel are pivoted into the folded position.

5. The structure set forth in claim 4 wherein said joint means includes a first clevis pivotally mounting said first structural member for movement about a substantially horizontal axis and a mounting ear extending downwardly from said clevis, said biasing means being connected to said mounting ear.

6. The structure set forth in claim 5 wherein said biasing means includes a coil tension spring, one end of which is connected to said mounting ear and the opposite end of which is connected to said first structural member.

7. An assembly for indicating the distance traveled over the ground comprising a first structural member having first and second end portions, a wheel rotatably connected to said first end portion, distance measuring means connected to said wheel for measuring the distance travelled over the ground, joint means connected to said second end portion of said first structural member for permitting pivotal movement of said first structural member and said wheel in the vertical direction in relation to the ground, and biasing means for biasing said wheel and said first structural member in the downward direction relative to the ground when said structural member and said wheel are in the measuring position for maintaining said wheel in intimate engagement with the ground to assure accurate distance measurements of the ground traversed, said biasing means connecting said joint means with said first structural member at a point between said first end portion end said second end portion of said first structural member.

8. The structure set forth in claim 7 wherein said joint means includes a first clevis pivotally mounting said first structural member for pivotal movement about a substantially horizontal axis and a mounting ear extending downwardly from said first clevis, said biasing means being connected to said mounting ear.

9. The structure set forth in claim 8 wherein said biasing means includes a coil tension spring, one end of which is connected to said mounting ear and the opposite end of which is connected to said first structural member at a point between its first and second end portions.

10. The structure set forth in claim 9 wherein said joint means includes a second clevis, said first and second clevis defining a universal joint permitting pivotal movement of said first structural member and said wheel in the vertical and horizontal directions in relation to the ground.

* * * * *